(12) United States Patent
Okada et al.

(10) Patent No.: US 11,381,870 B2
(45) Date of Patent: Jul. 5, 2022

(54) RECEIVING APPARATUS, COMMUNICATION SYSTEM, AND RECEIVING APPARATUS CONTROL METHOD

(71) Applicant: SONY SEMICONDUCTOR SOLUTIONS CORPORATION, Kanagawa (JP)

(72) Inventors: Satoshi Okada, Kanagawa (JP); Yutaka Nakada, Kanagawa (JP); Ryosuke Suda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/250,470

(22) PCT Filed: May 15, 2019

(86) PCT No.: PCT/JP2019/019231
§ 371 (c)(1),
(2) Date: Jan. 25, 2021

(87) PCT Pub. No.: WO2020/026559
PCT Pub. Date: Feb. 6, 2020

(65) Prior Publication Data
US 2021/0289257 A1 Sep. 16, 2021

(30) Foreign Application Priority Data
Aug. 2, 2018 (JP) .............................. JP2018-146028

(51) Int. Cl.
*H04N 21/438* (2011.01)
*H04B 1/16* (2006.01)
*H04N 21/4385* (2011.01)

(52) U.S. Cl.
CPC ....... *H04N 21/4382* (2013.01); *H04B 1/1607* (2013.01); *H04N 21/4383* (2013.01); *H04N 21/4385* (2013.01)

(58) Field of Classification Search
CPC .......... H04N 21/4382; H04N 21/4383; H04N 21/4385; H04B 1/1607
See application file for complete search history.

(56) References Cited

U.S. PATENT DOCUMENTS 8,422,584 B2 * 4/2013 Fujita .................... H04L 5/0044
375/295
9,094,276 B2 * 7/2015 Ko ........................ H04L 5/0053
(Continued)

FOREIGN PATENT DOCUMENTS

CN 107925780 A1 4/2018
EP 3340636 A1 6/2018
(Continued)

OTHER PUBLICATIONS

International Search Report and Written Opinion of PCT Application No. PCT/JP2019/019231, dated Jul. 2, 2019, 09 pages of ISRWO.

(Continued)

*Primary Examiner* — Peter D Le
(74) *Attorney, Agent, or Firm* — Chip Law Group

(57) ABSTRACT

Channel bonding is realized in a receiving apparatus that receives terrestrial digital broadcasting compliant with an ATSC 3.0 Standard. A receiving section selects any one of a plurality of frequency channels as a bonding source channel and receives a frame from the bonding source channel. A control section performs processing for obtaining one frequency channel in which packets are to be bonded with the bonding source channel among the plurality of frequency channel as a bonding destination channel on the basis of the frame and processing for controlling the receiv- (Continued)

ing section to newly receive a frame from the bonding destination channel. A decoding section decodes the frame and acquires the packets. A bonding section bonds together the packets corresponding to the bonding source channel and the packets corresponding to the bonding destination channel.

8 Claims, 12 Drawing Sheets

(56) References Cited

U.S. PATENT DOCUMENTS

| | | | | |
|---|---|---|---|---|
| 2002/0080285 | A1* | 6/2002 | Oshima | H04L 1/006 |
| | | | | 348/724 |
| 2004/0083495 | A1* | 4/2004 | Lane | H04W 52/281 |
| | | | | 725/127 |
| 2005/0068204 | A1* | 3/2005 | Jeon | H04N 21/434 |
| | | | | 341/50 |
| 2005/0177860 | A1* | 8/2005 | Goyal | H04N 21/4383 |
| | | | | 725/118 |
| 2006/0034379 | A1* | 2/2006 | Yang | H04L 27/2675 |
| | | | | 375/260 |
| 2006/0146944 | A1* | 7/2006 | Chiu | H04B 1/71632 |
| | | | | 375/260 |
| 2006/0290808 | A1* | 12/2006 | Choi | H04N 21/431 |
| | | | | 348/468 |
| 2007/0079339 | A1* | 4/2007 | Hanabusa | H04N 21/6131 |
| | | | | 725/73 |
| 2009/0109997 | A1* | 4/2009 | Koo | H04N 21/4382 |
| | | | | 370/464 |
| 2009/0135713 | A1* | 5/2009 | Hwang | H04L 5/0037 |
| | | | | 370/210 |
| 2010/0061466 | A1* | 3/2010 | Gozen | H04H 20/95 |
| | | | | 375/240.28 |
| 2013/0235882 | A1* | 9/2013 | Chen | H04L 12/2863 |
| | | | | 370/432 |
| 2013/0343468 | A1* | 12/2013 | Ko | H04L 5/0023 |
| | | | | 375/240.25 |
| 2015/0003544 | A1* | 1/2015 | Ouchi | H04B 7/068 |
| | | | | 375/260 |
| 2015/0146653 | A1* | 5/2015 | Zhang | H04L 5/0041 |
| | | | | 370/329 |
| 2015/0256323 | A1* | 9/2015 | Gandarillas Diego | |
| | | | | H04W 72/0453 |
| | | | | 370/281 |
| 2016/0164635 | A1* | 6/2016 | Moon | H04L 1/0061 |
| | | | | 370/474 |
| 2016/0309457 | A1* | 10/2016 | Eitan | H04B 7/0426 |
| 2017/0222701 | A1* | 8/2017 | Moon | H04L 1/0071 |
| 2017/0366381 | A1* | 12/2017 | Zoellner | H04L 5/001 |
| 2018/0026846 | A1 | 1/2018 | Walker et al. | |
| 2018/0167230 | A1* | 6/2018 | Motozuka | H04L 27/2613 |
| 2019/0007709 | A1* | 1/2019 | Oh | H04N 21/2353 |
| 2019/0052395 | A1* | 2/2019 | Motozuka | H04L 1/1614 |
| 2019/0090253 | A1* | 3/2019 | Da Silva | H04W 72/085 |
| 2019/0327500 | A1* | 10/2019 | Yang | H04L 27/2602 |
| 2019/0327740 | A1* | 10/2019 | Verma | H04W 72/0453 |
| 2020/0153520 | A1* | 5/2020 | Yamagishi | H04N 21/443 |
| 2020/0374174 | A1* | 11/2020 | Zoellner | H04L 1/0042 |

FOREIGN PATENT DOCUMENTS

| | | |
|---|---|---|
| JP | 2018-532294 A | 11/2018 |
| TW | 201804776 A | 2/2018 |
| WO | 2017/030425 A1 | 2/2017 |
| WO | 2018/017342 A1 | 1/2018 |

OTHER PUBLICATIONS

"ATSC Standard: Physical Layer Protocol Doc (A/322)", Doc. A/322:2017, Jun. 6, 2017, Advanced Television Systems Committee, 262 pages.

* cited by examiner

FIG.6

| L1-Detail INFORMATION | |
|---|---|
| Syntax | No. of Bits |
| L1_Detail_signaling() { | |
|     L1D_version | 4 |
|     L1D_num_rf | 3 |
|     for (L1D_rf_id=1 .. L1D_num_rf) { | |
|         L1D_bonded_bsid ～601 | 16 |
|         Reserved | 3 |
|         for (j=0 .. L1D_num_plp) { | |
|             L1D_plp_id ～602 | 6 |
|             L1D_plp_lls_flag ～603 | 1 |
|             L1D_plp_layer | 2 |
|             L1D_plp_start | 24 |
|             L1D_plp_size | 24 |
|             L1D_scrambler_type | 2 |
|             L1D_plp_fec_type | 4 |
|             if(L1D_plp_fec_type∈{0,1,2,3,4,5}){ | |
|                 L1D_plp_mod | 4 |
|                 L1D_plp_cod | 4 |
|             } | |
|             L1D_plp_TI_mode | 2 |
|             if (L1D_plp_TI_mode=00) { | |
|                 L1D_plp_fec_block_start | 15 |
|             } else if (L1D_plp_TI_mode=01) { | |
|                 L1D_plp_CTI_fec_block_start | 22 |
|             } | |
|             if (L1D_num_rf>0) { | |
|                 L1D_plp_num_channel_bonded ～604 | 3 |
|                 if (L1D_plp_num_channel_bonded>0) { | |
|                     L1D_plp_channel_bonding_format | 3 |
|                     for (k=0..L1D_plp_num_channel_bonded){ | |
|                         L1D_plp_bonded_rf_id | 3 |
|                     } | |
|                 } | |
|             } | |
|     L1D_bsid ～605 | 16 |
|     L1D_reserved | as needed |
|     L1D_crc | 32 |
| } | |

RECEIVING APPARATUS, COMMUNICATION SYSTEM, AND RECEIVING APPARATUS CONTROL METHOD

CROSS REFERENCE TO RELATED APPLICATIONS

This application is a U.S. National Phase of International Patent Application No. PCT/JP2019/019231 filed on May 15, 2019, which claims priority benefit of Japanese Patent Application No. JP 2018-146028 filed in the Japan Patent Office on Aug. 2, 2018. Each of the above-referenced applications is hereby incorporated herein by reference in its entirety.

TECHNICAL FIELD

The present technology relates to a receiving apparatus, a communication system, and a receiving apparatus control method. Specifically, the present technology relates to a receiving apparatus that receives terrestrial digital broadcasting, a communication system receiving terrestrial digital broadcasting, and a receiving apparatus control method.

BACKGROUND ART

Development and research of a receiving apparatus for receiving next-generation terrestrial digital broadcasting using an ATSC (Advanced Television Systems Committee standards) 3.0 standard have recently been underway. In this ATSC 3.0 standard, use of a technology called channel bonding is planned for improvement of frequency band utilization efficiency (refer to, for example, NPL 1). The channel bonding means herein that, when a transmitting apparatus partitions one stream into a plurality of pieces of data and transmits the plurality of pieces of data via frequency channels different from each other, a receiving apparatus receives those pieces of data and bonds the data together.

CITATION LIST

Non Patent Literature

[NPL 1]
"ATSC Standard: Physical Layer Protocol Doc. A/322: 2017," Advanced Television Systems Committee, Internet (https://www.atsc.org/standards/atsc3-0-standards/)

SUMMARY

Technical Problem

The conventional technology described above is capable of improving the frequency band utilization efficiency with use of the channel bonding. NPL 1, however, does not describe receiving-side specifications while describing transmitting-side specifications. For this reason, development of a channel bonding-enabled receiving apparatus is required.

The present technology has been achieved in light of such circumstances, and an object of the present technology is to realize channel bonding in a receiving apparatus that receives terrestrial digital broadcasting compliant with the ATSC 3.0 standard.

Solution to Problem

The present technology has been made to solve the problem described above, and a first aspect of the present technology provides a receiving apparatus including a receiving section that selects any one of a plurality of frequency channels as a bonding source channel and that receives a frame from the bonding source channel, a control section that performs processing for obtaining one frequency channel in which packets are to be bonded with the bonding source channel among the plurality of frequency channel as a bonding destination channel on the basis of the frame and processing for controlling the receiving section to newly receive a frame from the bonding destination channel, a decoding section that decodes the frame and that acquires the packets, and a bonding section that bonds together the packets corresponding to the bonding source channel and the packets corresponding to the bonding destination channel. This can produce an effect of switching the bonding source channel to the bonding destination channel obtained on the basis of the frame.

Moreover, according to this first aspect, the frame may contain a preamble in which a BSID (Broadcast Stream ID) of a bonding destination is described, and the control section may acquire a frequency channel corresponding to the BSID as the bonding destination channel. This can produce an effect of switching the frequency channel to the frequency channel corresponding to the BSID of the bonding destination.

Moreover, according to this first aspect, the receiving section may include first and second receiving circuits each of which receives the frame from a frequency channel different for each circuit, the first receiving circuit may receive the frame from the bonding source channel, and the control section may control the second receiving circuit to receive the frame from the bonding destination channel. This can produce an effect of causing the second receiving circuit to switch the channel to the bonding destination channel obtained on the basis of the frame received by the first receiving circuit.

Moreover, according to this first aspect, the frame may contain a preamble in which an LLS (Low Level Signaling) flag is described, and the control section may exercise control to newly receive the frame from the bonding destination channel in a case in which the LLS flag of a predetermined value is acquired from the preamble. This can produce an effect of switching the channel to the bonding destination channel at the time of acquiring the LLS flag of the predetermined value.

Moreover, according to this first aspect, the receiving apparatus may further include a rear stage processing section that performs processing for generating a channel map from LLS information and an LMT (Link Mapping Table) as rear stage processing. This can produce an effect of generating the channel map.

Moreover, according to this first aspect, the frame may contain a predetermined number of physical layer pipes, the LLS flag may be described in the preamble for each of the physical layer pipes, and the rear stage processing section may acquire the LLS information and the LMT from the physical layer pipe corresponding to the LLS flag of the predetermined value. This can produce an effect of generating the channel map from the LLS information and the LMT.

Moreover, according to this first aspect, the frame may be a frame compliant with an ATSC (Advanced Television Systems Committee standards) 3.0 standard. This can produce an effect of switching the channel to the bonding destination channel obtained on the basis of the frame compliant with the ATSC 3.0 standard.

Moreover, a second aspect of the present technology provides a communication system including a transmitting apparatus that transmits a frame from each of a plurality of frequency channels, a receiving section that selects any one of the plurality of frequency channels as a bonding source channel and that receives the frame from the bonding source channel, a control section that performs processing for obtaining one frequency channel in which packets are to be bonded with the bonding source channel among the plurality of frequency channel as a bonding destination channel on the basis of the frame and processing for controlling the receiving section to newly receive the frame from the bonding destination channel, a decoding section that decodes the frame and that acquires the packets, and a bonding section that bonds together the packets corresponding to the bonding source channel and the packets corresponding to the bonding destination channel. This can produce an effect of enabling the receiving apparatus to switch the bonding source channel to the bonding destination channel obtained on the basis of the frame transmitted by the transmitting apparatus from the bonding source channel.

Advantageous Effect of Invention

According to the present technology, it is possible to exhibit an excellent advantage that the receiving apparatus that receives terrestrial digital broadcasting compliant with the ATSC 3.0 standard is capable of realizing channel bonding. It is noted that advantages are not always limited to the advantage described herein and may be any of advantages described in the present disclosure.

BRIEF DESCRIPTION OF DRAWINGS

FIG. 6 is a diagram depicting an example of a syntax of L1-Detail information according to the first embodiment of the present technology.

DESCRIPTION OF EMBODIMENTS

Modes for carrying out the present technology (hereinafter, referred to as "embodiments") will be described hereinafter. Description will be given in the following order.

1. First Embodiment (example of switching frequency channels on the basis of L1 information)

2. Second Embodiment (example of providing two RF receiving circuits and switching frequency channels on the basis of L1 information)

1. First Embodiment

[Example of Configuration of Communication System]

Figure 1:
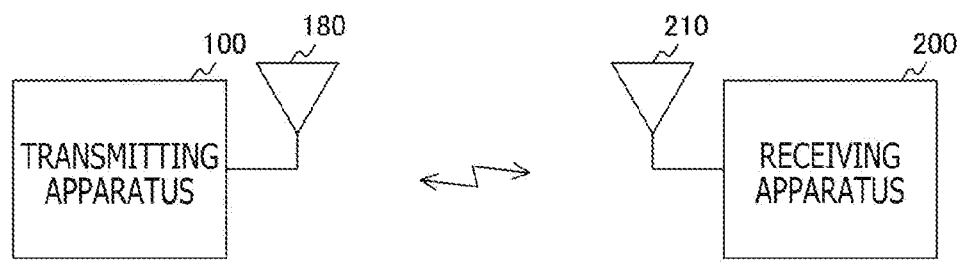
FIG. 1 is a block diagram depicting an example of a configuration of a communication system according to a first embodiment of the present technology.

FIG. 1 is a block diagram depicting an example of a configuration of a communication system according to a first embodiment of the present technology. This communication system is a system that transmits and receives terrestrial digital broadcasting compliant with the ATSC 3.0 standard and includes a transmitting apparatus 100 and a receiving apparatus 200.

The transmitting apparatus 100 includes an antenna 180. This transmitting apparatus 100 transmits data in OFDM frame units from a plurality of frequency channels. The antenna 180 transmits an OFDM-modulated RF (Radio Frequency) signal.

The receiving apparatus 200 includes an antenna 210. This receiving apparatus 200 receives data in OFDM frame units via the plurality of frequency channels. The antenna 210 receives the OFDM-modulated RF signal.

[Example of Configuration of Receiving Apparatus]

Figure 2:
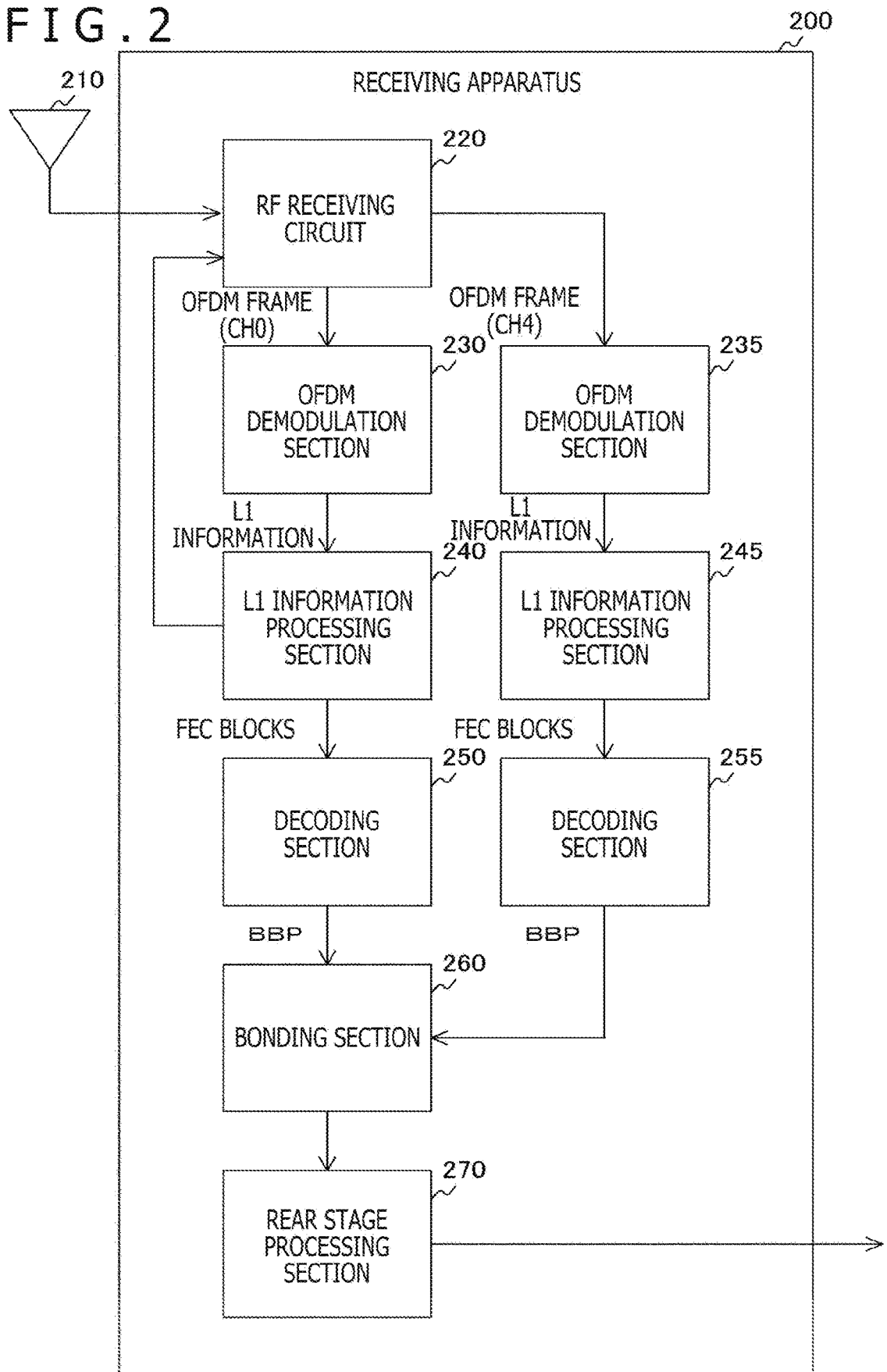
FIG. 2 is a block diagram depicting an example of a configuration of a receiving apparatus according to the first embodiment of the present technology.

FIG. 2 is a block diagram depicting an example of a configuration of the receiving apparatus 200 according to the first embodiment of the present technology. This receiving apparatus 200 includes not only the antenna 210 but also an RF receiving circuit 220, OFDM demodulation sections 230 and 235, L1 information processing sections 240 and 245, and decoding sections 250 and 255. Further, the receiving apparatus 200 also includes a bonding section 260 and a rear stage processing section 270.

The RF receiving circuit 220 selects any one of a plurality of frequency channels, performs AD (Analog to Digital) conversion and frequency conversion on an analog RF signal, and acquires a baseband signal of the selected frequency channel. The baseband signal is thereby received. The RF receiving circuit 220 supplies the baseband signal to the OFDM demodulation section 230 in OFDM frame units.

The OFDM demodulation section 230 demodulates an OFDM frame from the RF receiving circuit 220. This OFDM demodulation section 230 acquires L1 information and an FEC (Forward Error Correction) block group corresponding to each PLP (Physical Layer Pipe) by demodulation, and supplies the L1 information and the FEC block group to the L1 information processing section 240.

In the ATSC 3.0 standard, data is transmitted herein in data structures called PLPs (Physical Layer Pipes). Further, the transmitting side is required to be capable of transmitting up to 64 PLPs, and the receiving side is required to be capable of simultaneously processing up to four PLPs.

The L1 information processing section 240 acquires a frequency channel in which packets are to be bonded with the current frequency channel, on the basis of the L1 information from the OFDM demodulation section 230. The current frequency channel selected by the RF receiving circuit 220 will be referred to as a "bonding source channel," and the frequency channel in which packets are to bonded with the bonding source channel will be referred to as a "bonding destination channel," hereinafter.

The L1 information processing section 240 controls the RF receiving circuit 220 to switch a frequency channel from which packets are to be received, from the bonding source channel (such as CH0) to the bonding destination channel (such as CH4). The RF receiving circuit 220 then newly receives an OFDM frame from the bonding source channel and supplies the OFDM frame to the OFDM demodulation section 235. The bonding destination channel is not always present. In a case in which the bonding destination channel is not present, the RF receiving circuit 220 switches over the frequency channels in a constant order such as an order of CH1, CH2, and CH3. It is noted that the L1 information processing section 240 is an example of a control section set forth in claims.

Further, the L1 information processing section 240 acquires information (an encoding scheme and a code rate) necessary for decoding FEC blocks from the L1 information, and supplies the necessary information together with an FEC block group corresponding to each PLP to the decoding section 250.

The decoding section 250 decodes the FEC blocks corresponding to each PLP, acquires baseband packets (BBPs), and outputs the baseband packets to the bonding section 260.

The OFDM demodulation section 235 demodulates the OFDM frame from the RF receiving circuit 220, acquires L1 information and an FEC block group corresponding to each PLP, and supplies the L1 information and the FEC block group to the L1 information processing section 245.

The L1 information processing section 245 acquires information necessary for decoding FEC blocks from the L1 information, and supplies the necessary information together with the FEC block group corresponding to each PLP to the decoding section 255.

The decoding section 255 decodes the FEC blocks corresponding to each PLP, acquires BBPs, and outputs the BBPs to the bonding section 260.

The bonding section 260 bonds together the BBPs corresponding to the bonding source channel and the BBPs corresponding to the bonding destination channel, and reconstructs an original stream. This bonding section 260 supplies the stream after bonding to the rear stage processing section 270.

The rear stage processing section 270 generates video and a sound by performing decoding processing and the like on the stream, and outputs the video and the sound to a display device and a speaker. In addition, the rear stage processing section 270 acquires LLS (Low Level Signaling) information and an LMT (Link Mapping Table) from the PLPs configuring the stream, and generates a channel map from those pieces of information.

The LLS information is information regarding higher layers (such as a transport layer and an application layer) than a physical layer, and contains an SLT (Service List Table) and the like. The SLT contains information for creating a list of all services that can be received, together with channel names, channel information, and the like, by the receiving side at high speed. Details of the LLS information are described in "'ATSC Standard: Signaling, Delivery, Synchronization, and Error Protection,' Advanced Television Systems Committee, Internet (https://www.atsc.org/wp-content/uploads/2017/12/A331-2017-Signaling-Delivery-Sync-FEC-2.pdf)."

The LMT is information for providing a multicast list to which data is transmitted in PLP units. This LMT is contained in each PLP that transmits the LLS information. The LMT contains, for example, a source IP (Internet Protocol) address, destination IP addresses, a source UDP (User Datagram Protocol) port, and destination UDP ports per multicast. Details of the LMT are described in "'ATSC Standard: Link-Layer Protocol (A/330),' Advanced Television Systems Committee, Internet (https://www.atsc.org/wp-content/uploads/2016/10/A330-2016-Link-Layer-Protocol-3.pdf)."

The channel map is information indicating analysis results of the SLT and the LMT.

It is noted that the OFDM demodulation sections 230 and 235, the L1 information processing sections 240 and 245, the decoding sections 250 and 255, the bonding section 260, and the rear stage processing section 270 may each be provided in a single integrated circuit or may be provided in two integrated circuits in a distributed fashion. For example, at the time of distributing those sections to the two integrated circuits, the OFDM demodulation section 230, the L1 information processing section 240, the decoding section 250, the bonding section 260, and the rear stage processing section 270 are provided in one of the two integrated circuits, and the remaining sections are provided in the other integrated circuit.

[Example of Configuration of Transmitting Apparatus]

Figure 3:
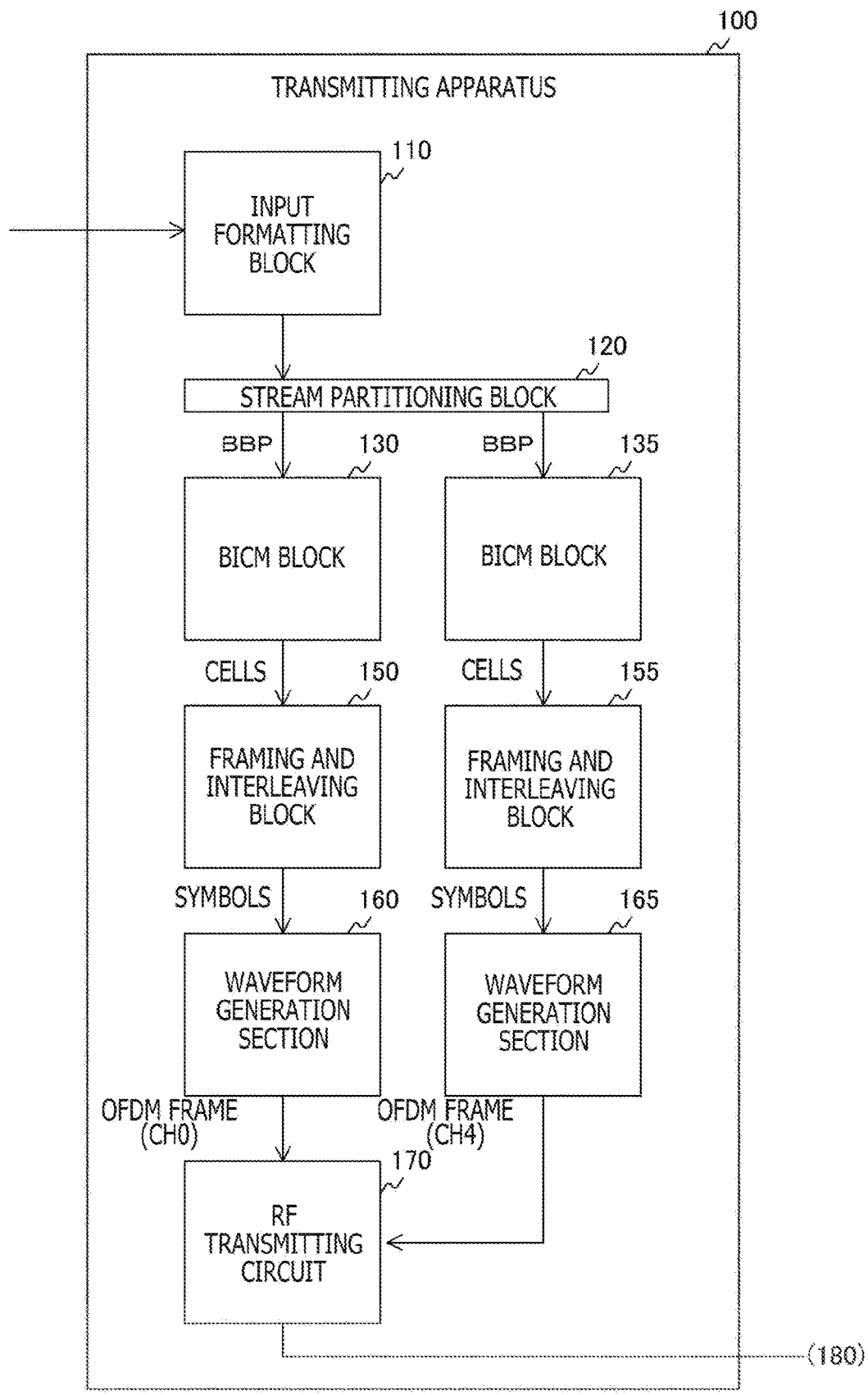
FIG. 3 is a block diagram depicting an example of a configuration of a transmitting apparatus according to the first embodiment of the present technology.

FIG. 3 is a block diagram depicting an example of a configuration of the transmitting apparatus 100 according to the first embodiment of the present technology. This transmitting apparatus 100 includes an input formatting block 110, a stream partitioning block 120, and BICM (Bit Interleaved and Coded Modulation) blocks 130 and 135. In addition, the transmitting apparatus 100 includes framing and interleaving blocks 150 and 155, waveform generation sections 160 and 165, and an RF transmitting circuit 170.

The input formatting block 110 encapsulates and compresses each of a plurality of pieces of input data to generate a BBP. The plurality of pieces of data obtained by partitioning a stream such as a video stream in fixed units is input to this input formatting block 110.

The input formatting block 110 encapsulates and compresses each data and generates ALP (ATSC Link layer Protocol) packets. The input formatting block 110 then partitions an ALP group including the ALP packets corresponding to each PLP into a plurality of parts per PLP, and generates BBPs each storing partitioned data in a payload. The input formatting block 110 supplies a stream containing those BBPs to the stream partitioning block 120.

The stream partitioning block 120 partitions the stream according to the number of frequency channels used in channel bonding. It is assumed herein that the stream is transmitted to the stream partitioning block 120 via two frequency channels. The stream partitioning block 120 partitions the stream into two in BBP units, supplies one of the partitioned data to the BICM block 130, and supplies the other partitioned data to the BICM block 135.

The BICM blocks 130 and 135 each encode a plurality of BBPs corresponding to each PLP and perform bit interleaving on the plurality of encoded BBPs per PLP, and output a plurality of cells. The BICM block 130 outputs a cell group corresponding to each PLP to the framing and interleaving block 150, while the BICM block 135 outputs a cell group corresponding to each PLP to the framing and interleaving block 155.

The framing and interleaving blocks 150 and 155 each perform time interleaving and frequency interleaving on the cell group corresponding to each PLP, and generate a symbol group configuring an OFDM frame. The framing and interleaving block 150 outputs the symbol group corresponding to an OFDM frame to the waveform generation section 160. Meanwhile, the framing and interleaving block 155 outputs the symbol group corresponding to an OFDM frame to the waveform generation section 165.

The waveform generation sections 160 and 165 each generate the OFDM frame by performing pilot signal insertion, inverse fast fourier transform (IFFT), guard interval insertion, and the like. The waveform generation sections 160 and 165 each output the OFDM frame to the RF transmitting circuit 170.

The OFDM demodulation sections 230 and 235 within the receiving apparatus 200 execute processing corresponding to the waveform generation sections 160 and 165, the framing and interleaving blocks 150 and 155, and interleaving in the BICM blocks 130 and 135. In addition, the decoding sections 250 and 255 within the receiving apparatus 200 execute decoding processing corresponding to encoding processing in the BICM blocks 130 and 135.

The RF transmitting circuit 170 transmits the OFDM frame from the waveform generation section 160 and the OFDM frame from the waveform generation section 165 via frequency channels different from each other. This RF transmitting circuit 170 transmits the OFDM frame from the waveform generation section 160 from, for example, the antenna 180 via a frequency channel CH0 or the like. Further, the RF transmitting circuit 170 transmits the OFDM frame from the waveform generation section 165 from, for example, the antenna 180 via a frequency channel (CH4 or the like) different from the frequency channel CH0. It is noted that two RF transmitting circuits and two antennas can be disposed as described later.

It is noted that frequency bands of the frequency channels CH0 and CH4 to be bonded together are not necessarily adjacent to each other. Moreover, while transmitting the OFDM frames via the two frequency channels at the time of using the channel bonding, the transmitting apparatus 100 is capable of transmitting the OFDM frames via three or more frequency channels. Further, processing within the transmitting apparatus 100 is described in "'ATSC Standard: Physical Layer Protocol Doc. A/322:2017,' Advanced Television Systems Committee, Internet (https://www.atsc.org/standards/atsc-3-0-standards/)."

Figure 4:
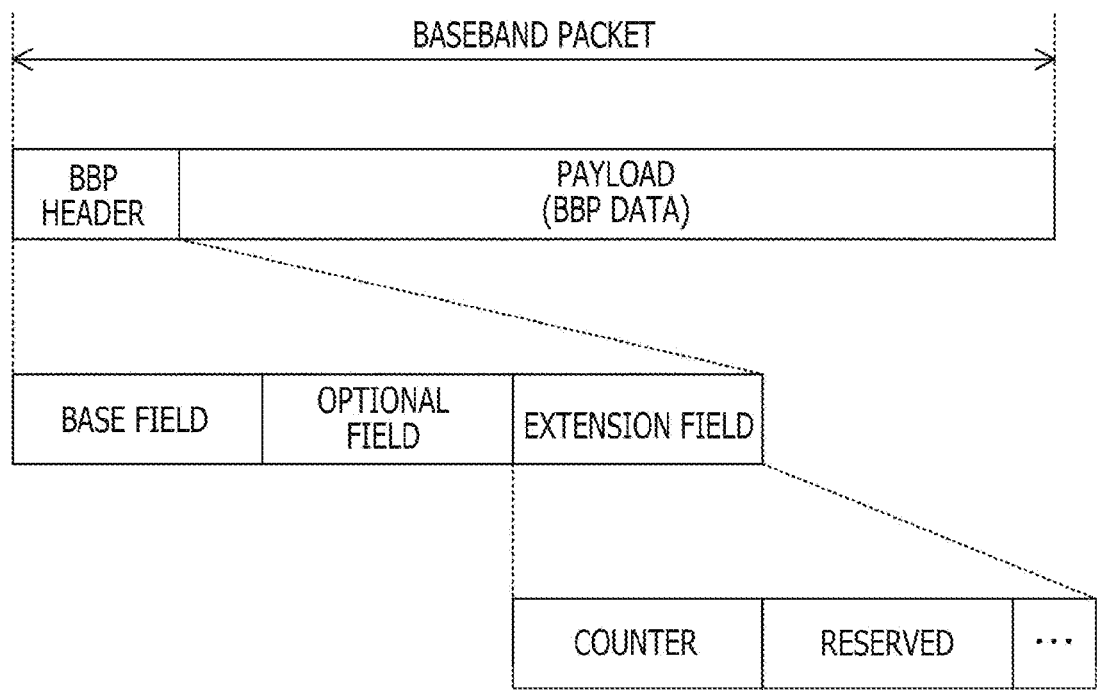
FIG. 4 is a diagram depicting an example of a data structure of a baseband packet according to the first embodiment of the present technology.

FIG. 4 is a diagram depicting an example of a data structure of the baseband packet (BBP) according to the first embodiment of the present technology. This BBP contains a BBP header and a payload. A base field, an optional field, and an extension field are provided in the BBP header. Moreover, a counter region and a reserved region are provided in the extension field. This counter takes on a value incrementing linearly by one for each BBP within one PLP, and an independent counter is used for every PLP. The counter within the extension field will be referred to as an "extension counter," hereinafter. Further, data stored in the payload will be referred to as "BBP data."

Figure 5:
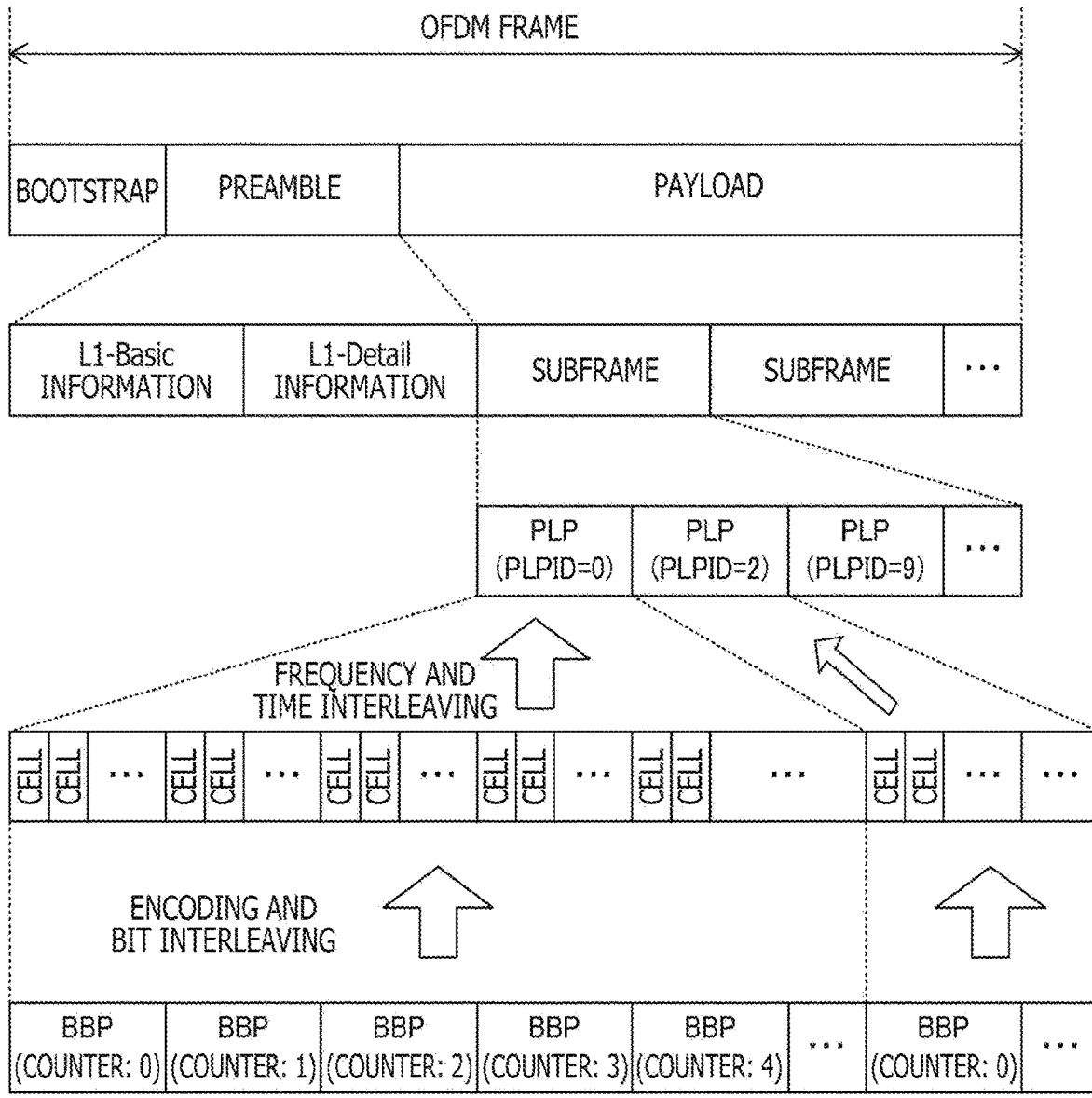
FIG. 5 is a diagram depicting an example of a data structure of an OFDM (Orthogonal Frequency Division Multiplexing) frame according to the first embodiment of the present technology.

FIG. 5 is a diagram depicting an example of a data structure of the OFDM frame according to the first embodiment of the present technology. The OFDM frame contains a bootstrap, a preamble, and a payload. L1 information including L1-Basic information and L1-Detail information is stored in the preamble. A pilot signal encoding scheme and the like are stored in the L1-Basic information. The L1-Detail information will be described later in detail. Up to 256 subframes are stored in the payload. In addition, up to 64 PLPs are stored in each of the subframes.

Further, content data, the LLS information, and the LMT can be stored in some PLPs. It is to be noted, however, that the LLS information and the LMT are not always stored in all PLPs. An LLS flag indicating whether or not the corresponding PLP contains the LLS information is stored in the L1-Detail information. Further, the LMT is contained in each PLP that transmits the LLS information.

The BICM blocks 130 and the like each perform encoding and bit interleaving on a BBP group corresponding to each PLP and generate a cell group corresponding to each PLP. Then, the framing and interleaving blocks 150 and the like perform frequency interleaving and time interleaving on the cell group corresponding to each PLP while generating the preamble, and generate a symbol group configuring an OFDM.

FIG. 6 is a diagram depicting an example of a syntax of the L1-Detail information according to the first embodiment of the present technology. This syntax is described in 'ATSC Standard: Physical Layer Protocol Doc. A/322:2017,' Advanced Television Systems Committee, Internet (https://www.atsc.org/standards/atsc-3-0-standards/).'

An "L1D_bonded_bsid" field is provided in a portion 601 surrounded by a broken line within the L1-Detail information. A value in this field is associated with a value of an ID in "L1D_rf_id," and indicates a BSID (Broadcast Stream ID) of a separate frequency channel (bonding destination channel) bonded with the current frequency channel (bonding source channel).

The BSID is herein a 16-bit value for identifying content of a set of broadcast signals. Each unique transmission signal has a unique BSID. For example, frequency-converted signals at different frequencies have the same BSID.

Further, an "L1D_plp_id" field is provided in a portion 602. Identification information regarding the PLP is described in this "L1D_plp_id" field.

An "L1D_plp_lls_flag" field is provided in a portion 603. This "L1D_plp_lls_flag" indicates whether one or more PLPs contain LLS information within the current OFDM frame. "0" is set to "L1D_plp_lls_flag" in a case in which the LLS information is not contained within the current OFDM frame, and "1" is set thereto in a case in which the LLS information is contained.

An "L1D_plp_num_channel_bonded" field in which the number of frequencies involved in channel bonding of the current PLP is described is provided in a portion 604. It is to be noted, however, that a value in this field is a value obtained by excluding the frequency of the current channel. In a case of using, for example, two frequencies, "1" is set to the "L1D_plp_num_channel_bonded" field. By referring to the "L1D_plp_num_channel_bonded" field, the receiving apparatus 200 is capable of determining whether or not to perform channel bonding.

An "L1D_bsid" field is provided in a portion 605. The BSID of the current frequency channel (bonding source channel) is described in this "L1D_bsid" field.

Figure 7:
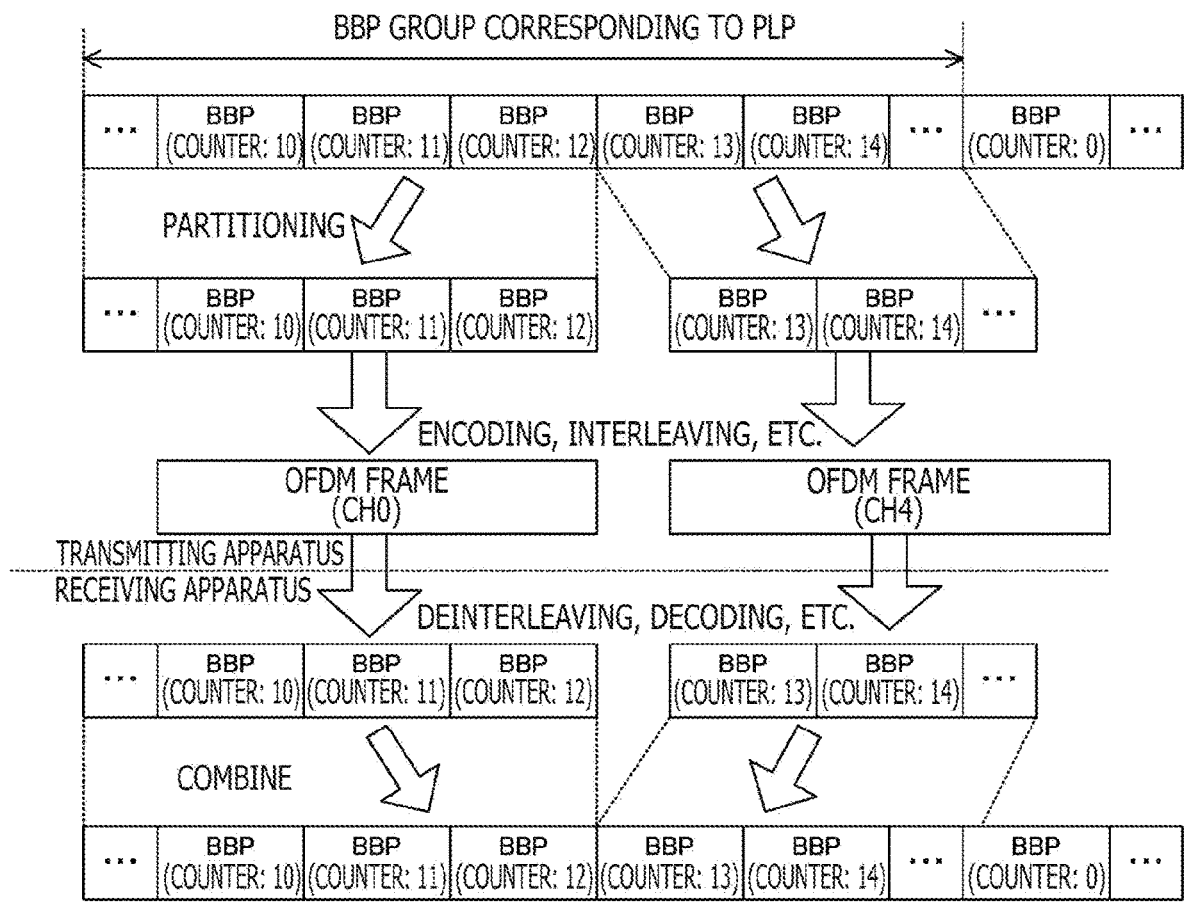
FIG. 7 is an explanatory diagram of stream partitioning according to the first embodiment of the present technology.

FIG. 7 is an explanatory diagram of stream partitioning according to the first embodiment of the present technology. It is supposed that a BBP group corresponding to a certain PLP is partitioned into two within a stream. In this BBP group, a value of the extension counter is allocated for each BBP, and the value is stored in the header of each BBP. The extension counter is initialized to zero for the top BBP within the PLP and increments by one for each BBP.

The stream partitioning block 120 partitions the BBP group corresponding to the PLP into, for example, a BBP group for which counter values are up to "12" and a BBP group for which counter values start at "13." The BICM block 130, the framing and interleaving block 150, and the waveform generation section 160 perform encoding, interleaving, and the like on the former BBP group to generate an OFDM frame corresponding to the frequency channel CH0. In contrast, the BICM block 135, the framing and interleaving block 155, and the waveform generation section 165 perform encoding, interleaving, and the like on the latter BBP group to generate an OFD frame corresponding to the frequency channel CH4.

The receiving apparatus 200 receives the OFDM frames described above via the frequency channels CH0 and CH4, and acquires the BBP group for which the counter values are up to "12" and the BBP group for which the counter values start at "13" by performing processing corresponding to the transmitting-side processing. Then, the receiving apparatus 200 reconstructs the original stream by arranging (in other words, bonding together) those BBPs in the order of the counter values. In this way, the receiving apparatus 200 is capable of bonding the BBPs corresponding to the frequency channel CH0 and the BBPs corresponding to the frequency channel CH4 together by referring to the value of the extension counter within each BBP.

Figure 8:
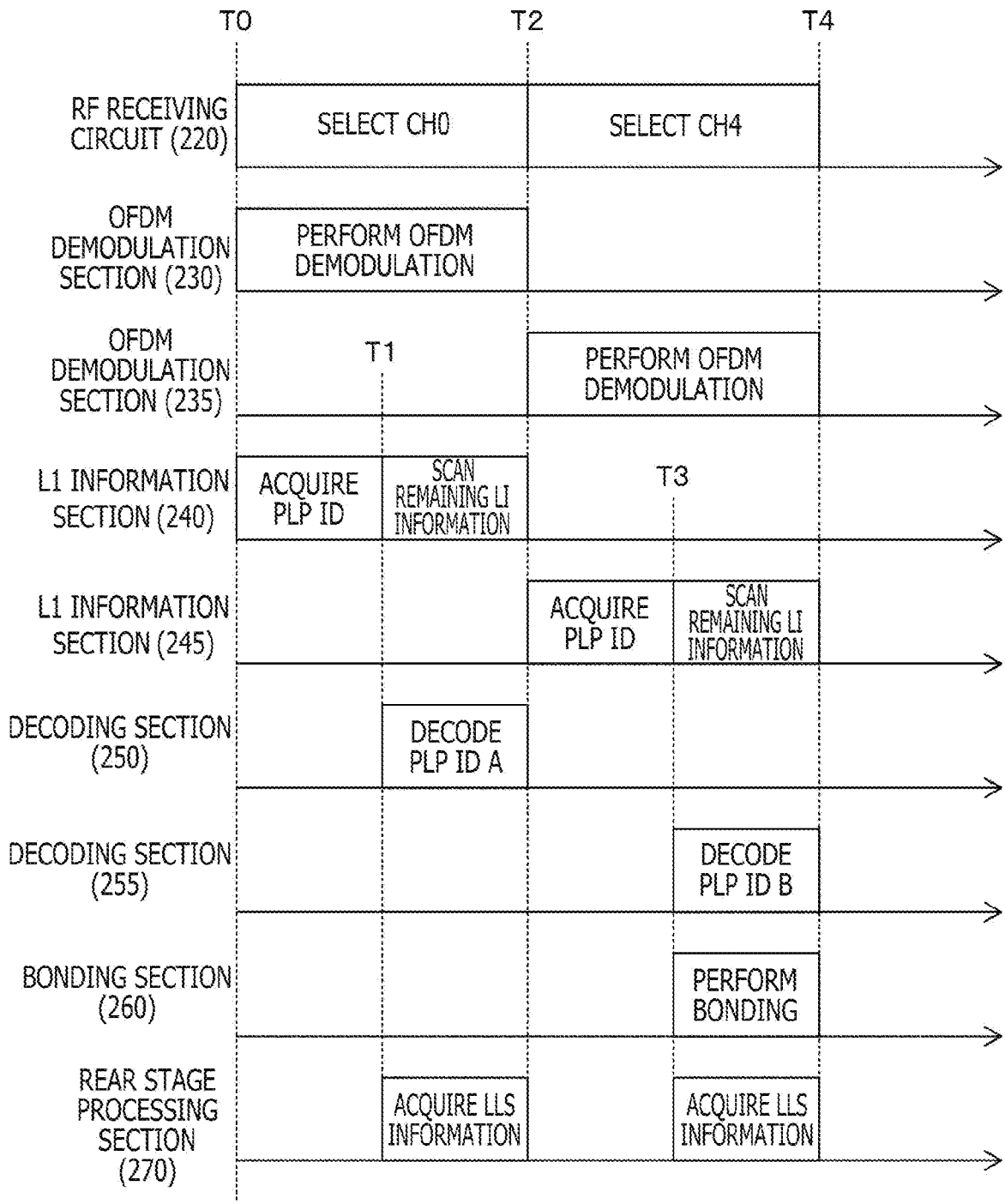
FIG. 8 is an example of a timing chart illustrating an operation of the receiving apparatus according to the first embodiment of the present technology.

FIG. 8 is a timing chart illustrating an example of an operation by the receiving apparatus 200 according to the first embodiment of the present technology. In a period from timing T0 to T2, the RF receiving circuit 220 first selects the frequency channel CH0 and receives an OFDM frame. The OFDM demodulation section 230 demodulates the OFDM frame and acquires the L1 information and an FEC block group corresponding to each PLP.

The L1 information processing section 240 scans the L1 information, acquires a PLP ID of the PLP for which "1" is set to the LLS flag at the timing T1, and scans remaining L1 information described after the LLS flag in a period from the timing T1 to T2. In the period from the timing T1 to T2, the decoding section 250 decodes the PLP having the acquired PLP ID. Further, in that period, the rear stage processing section 270 acquires LLS information.

Further, the L1 information processing section 240 scans the "L1D_bonded_bsid" field and obtains a frequency channel CH4 corresponding to the BSID of the bonding destination as the bonding destination channel. In a period from the timing T2 to T4, the RF receiving circuit 220 switches the frequency channel from which data is to be received, to the bonding destination channel CH4, and newly receives an OFDM frame. The OFDM demodulation section 235 demodulates the OFDM frame and acquires L1 information and an FEC block group corresponding to each PLP.

The L1 information processing section 245 scans the L1 information, acquires the PLP ID of the PLP for which "1" is set to the LLS flag at the timing T3, and scans remaining L1 information after the LLS flag in a period from the timing T3 to T4. In the period from the timing T3 to T4, the bonding section 260 bonds together the packets in the bonding source channel CH0 and the packets in the bonding destination channel CH4 as needed. It is noted that the bonding is not always performed. The L1 information processing section 245 can determine whether or not to perform the bonding by referring to the "L1D_plp_num_channel_bonded" field described above.

After the timing T4, the receiving apparatus 200 switches to remaining frequency channels CH1 to CH3 in sequence and repeats similar processing.

Figure 9:
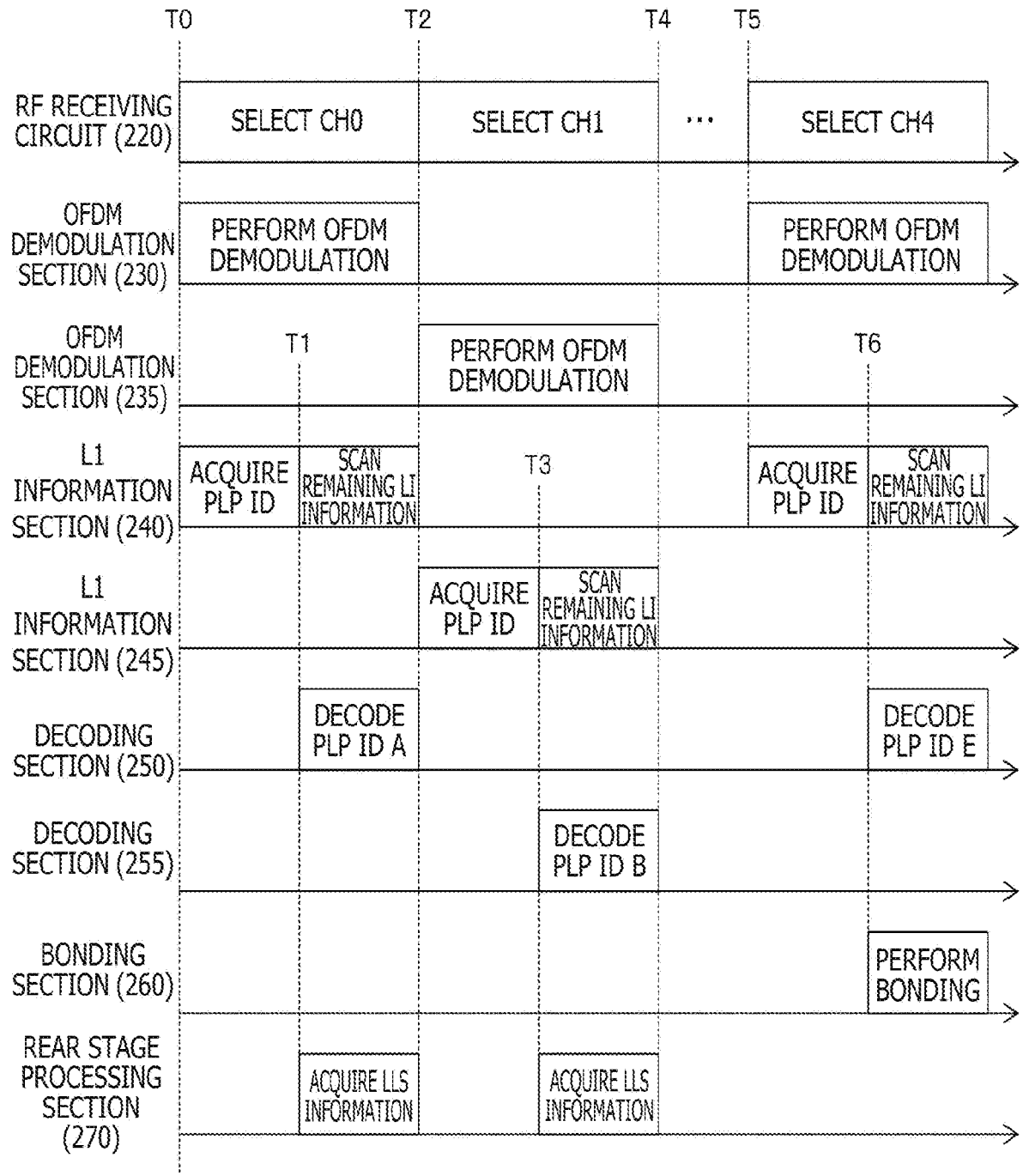
FIG. 9 is an example of a timing chart illustrating an operation by the receiving apparatus according to a comparison.

FIG. 9 is a timing chart illustrating an example of an operation by the receiving apparatus according to a comparison. In this comparison, it is assumed that the receiving apparatus switches the frequency channel to the frequency channels CH0 to CH4 in sequence, and scans the L1 information regarding the frequency channels in sequence.

In the period from the timing T0 to T2, the RF receiving circuit 220 first selects the frequency channel CH0 and receives an OFDM frame. The OFDM demodulation section 230 demodulates the OFDM frame, and the L1 information processing section 240 scans the L1 information regarding the frequency channel.

In a period from the timing T2 to T4, the RF receiving circuit 220 switches the frequency channel to the next frequency channel CH1 and receives an OFDM frame. The OFDM demodulation section 235 demodulates the OFDM frame, and the L1 information processing section 245 scans the L1 information regarding the frequency channel.

Likewise, the receiving apparatus switches the frequency channel to the channels CH2 to CH4 in sequence hereinafter. If the bonding destination channel bonded with the frequency channel CH0 is assumed as CH4, the receiving apparatus is incapable of starting bonding without waiting for timing T6 after switchover to the CH4.

By contrast, as exemplarily depicted in FIG. 8, with the configurations of scanning the L1 information, obtaining the bonding destination channel, and then switching the frequency channel to the bonding destination channel, the receiving apparatus is capable of starting bonding before switchover to the channels CH1 to CH3 that are not bonding destinations. It is thereby possible to reduce delay time before start of bonding, compared with the comparison.

[Example of Operation by Receiving Apparatus]

Figure 10:
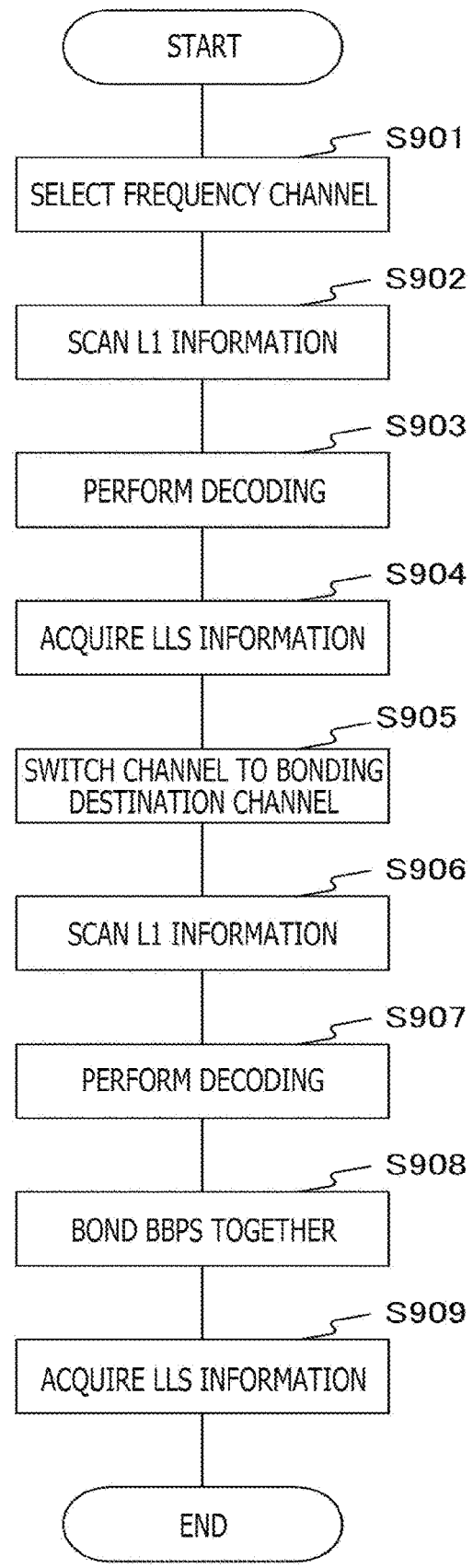
FIG. 10 is an example of a flowchart illustrating the operation of the receiving apparatus according to the first embodiment of the present technology.

FIG. 10 is a flowchart illustrating an example of the operation by the receiving apparatus 200 according to the first embodiment of the present technology. This operation is started at a time of, for example, execution of a predetermined application for the receiving apparatus 200 to receive broadcasting data.

The receiving apparatus 200 selects a predetermined frequency channel (Step S901), and scans L1 information (Step S902). Further, the receiving apparatus 200 decodes FEC blocks (Step S903), and acquires LLS information (Step S904).

The receiving apparatus 200 then switches the frequency channel to the bonding destination channel (Step S905) on the basis of the L1 information, and scans the L1 information (Step S906). Further, the receiving apparatus 200 decodes the FEC blocks (Step S907). Next, the receiving apparatus 200 bonds together the BBPs in the bonding source channel and the BBPs in the bonding destination channel (Step S908), and acquires LLS information (Step S909). After Step S909, the receiving apparatus 200 switches the frequency channel to the remaining frequency channels in sequence, performs similar processing, and ends the operation.

In this way, according to the first embodiment of the present technology, the receiving apparatus 200 switches the bonding source channel to the bonding destination channel on the basis of the L1 information within the OFDM frame for the bonding source channel, to bond the BBPs together; thus, it is possible to start bonding before switchover to the channel that is not the bonding destination. It is thereby possible to realize the channel bonding in the receiving apparatus 200. Moreover, it is possible to reduce the delay time before start of bonding, compared with the case of switching over the frequency channels in sequence regardless of whether or not the frequency channel is the bonding destination.

2. Second Embodiment

While the receiving apparatus 200 receives each OFDM frame only by the RF receiving circuit 220 in the first embodiment described above, it is impossible to simultaneously receive OFDM frames from a plurality of frequency channels in this configuration. The receiving apparatus 200 according to the second embodiment differs from that according to the first embodiment in that an RF receiving circuit 225 that receives an OFDM frame from a frequency channel different from the frequency channel from which the RF receiving circuit 220 receives the OFDM frame is further provided.

Figure 11:
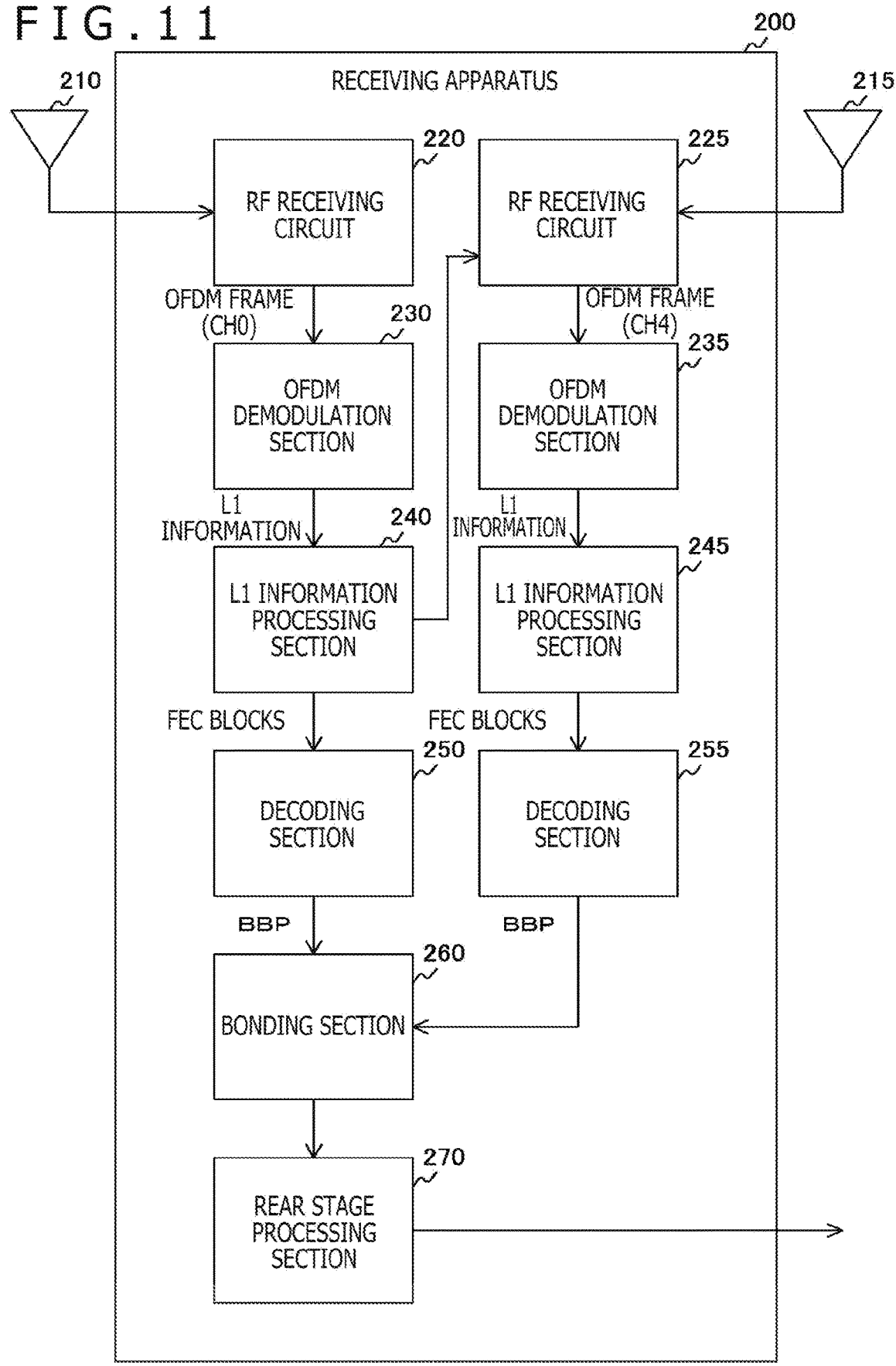
FIG. 11 is a block diagram illustrating an example of a configuration of a receiving apparatus according to a second embodiment of the present technology.

FIG. 11 is a block diagram depicting an example of a configuration of the receiving apparatus 200 according to the second embodiment of the present technology. The receiving apparatus 200 according to the second embodiment differs from that according to the first embodiment in that the receiving apparatus 200 further includes an antenna 215 and the RF receiving circuit 225.

The RF receiving circuit 225 receives an OFDM frame from a frequency channel different from the frequency channel from which the RF receiving circuit 220 receives the OFDM frame according to control by the L1 information processing section 240. It is noted that the RF receiving circuit 220 is an example of a first receiving circuit set forth in the claims, while the RF receiving circuit 225 is an example of a second receiving circuit set forth in the claims.

Figure 12:
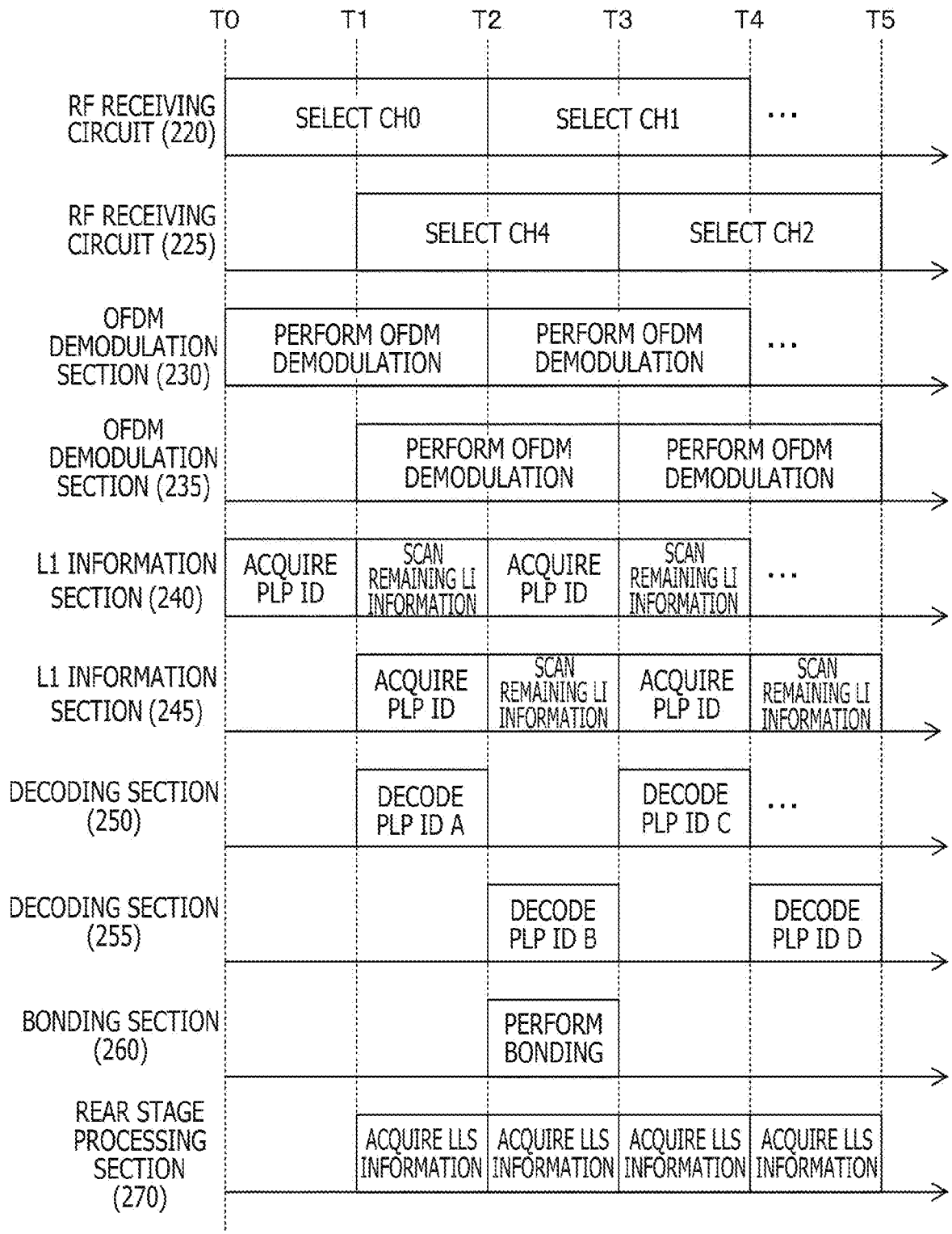
FIG. 12 is a flowchart illustrating an example of an operation by the receiving apparatus according to the second embodiment of the present technology.

FIG. 12 is a timing chart illustrating an example of an operation by the receiving apparatus 200 according to the second embodiment of the present technology.

In the period from the timing T0 to T2, the RF receiving circuit 220 first selects the frequency channel CH0 and receives an OFDM frame, and the OFDM demodulation section 230 demodulates the OFDM frame.

The L1 information processing section 240 scans the L1 information, and acquires a PLP ID of the PLP for which "1" is set to the LLS flag at the timing T1. Further, the L1 information processing section 240 obtains the frequency channel CH4 corresponding to the BSID of the bonding destination as the bonding destination channel, and controls the RF receiving circuit 225 to switch the current frequency channel to the frequency channel.

In a period from the timing T1 to T3, the RF receiving circuit 225 selects the frequency channel CH4 and receives an OFDM frame, and the OFDM demodulation section 235 demodulates the OFDM frame.

The L1 information processing section 245 scans the L1 information, and acquires a PLP ID of the PLP for which "1" is set to the LLS flag. In a period from the timing T2 to T3, the bonding section 260 bonds together the packets in the bonding source channel CH0 and the packets in the bonding destination channel CH4 as needed. It is noted that the bonding is not always performed. The L1 information processing section 245 can determine whether or not to perform the bonding by referring to the "L1D_plp_num_channel_bonded" field described above.

The RF receiving circuit 220 selects the frequency channel CH1 in a period from the timing T2 to 4, and the RF receiving circuit 225 selects the channel CH2 in a period from the timing T3 to 5. The rear stage circuits of the OFDM demodulation sections 230 and 235 repeat a similar operation for the remaining channels.

While the two RF receiving circuits 220 and 225 are disposed in the receiving apparatus, three or more RF receiving circuits can be disposed and OFDM frames can be received from three or more frequency channels in parallel.

In this way, according to the second embodiment of the present technology, the two RF receiving circuits 220 and 225 are disposed; thus, the RF receiving circuit 225 is capable of starting reception of the frame in the bonding destination channel while the RF receiving circuit 225 is receiving the frame in the bonding source channel. It is thereby possible to further reduce the delay time before start of bonding.

It is noted that the embodiments each illustrate an example for embodying the present technology and that a correspondence relation is held between each of the matters in the embodiments and each of invention specifying matters in the claims. Likewise, a correspondence relation is held between each of the invention specifying matters in the claims and each of matters in the embodiments of the present technology, the matters denoted by the same name as the invention specifying matters in the claims. However, the present technology is not limited to the embodiments and can be embodied by making various modifications of the embodiments without departing from the spirit of the technology.

Moreover, processing procedures described in the above embodiments may be regarded as a method involving these series of procedures or may be regarded as a program for causing a computer to execute these series of procedures or as a recording medium that stores the program. Examples of this recording medium include a CD (Compact Disc), an MD (MiniDisc), a DVD (Digital Versatile Disc), a memory card, a Blu-ray (registered trade mark) Disc, or the like.

Further, the advantages described in the present specification are given as an example only, and the advantages are not limited to those described in the present specification and may have other advantages.

It is noted that the present technology can also be configured as follows.

(1) A receiving apparatus including:
a receiving section that selects any one of a plurality of frequency channels as a bonding source channel and that receives a frame from the bonding source channel;
a control section that performs processing for obtaining one frequency channel in which packets are to be bonded with the bonding source channel among the plurality of frequency channel as a bonding destination channel on the basis of the frame and processing for controlling the receiving section to newly receive a frame from the bonding destination channel;
a decoding section that decodes the frame and that acquires the packets; and
a bonding section that bonds together the packets corresponding to the bonding source channel and the packets corresponding to the bonding destination channel.

(2) The receiving apparatus according to (1), in which
the frame contains a preamble in which a BSID (Broadcast Stream ID) of a bonding destination is described, and
the control section acquires a frequency channel corresponding to the BSID as the bonding destination channel.

(3) The receiving apparatus according to (1) or (2), in which
the receiving section includes first and second receiving circuits each of which receives the frame from a frequency channel different for each circuit, the first receiving circuit receives the frame from the bonding source channel, and the control section controls the second receiving circuit to receive the frame from the bonding destination channel.

(4) The receiving apparatus according to any one of (1) to (3), in which the frame contains a preamble in which an LLS (Low Level Signaling) flag is described, and the control section exercises control to newly receive the frame from the bonding destination channel in a case in which the LLS flag of a predetermined value is acquired from the preamble.

(5) The receiving apparatus according to (4), further including:

a rear stage processing section that performs processing for generating a channel map from LLS information and an LMT (Link Mapping Table) as rear stage processing.

(6) The receiving apparatus according to (5), in which the frame contains a predetermined number of physical layer pipes, the LLS flag is described in the preamble for each of the physical layer pipes, and the rear stage processing section acquires the LLS information and the LMT from the physical layer pipe corresponding to the LLS flag of the predetermined value.

(7) The receiving apparatus according to any one of (1) to (6), in which the frame is a frame compliant with an ATSC (Advanced Television Systems Committee standards) 3.0 standard.

(8) A communication system including:

a transmitting apparatus that transmits a frame from each of a plurality of frequency channels;

a receiving section that selects any one of the plurality of frequency channels as a bonding source channel and that receives the frame from the bonding source channel;

a control section that performs processing for obtaining one frequency channel in which packets are to be bonded with the bonding source channel among the plurality of frequency channel as a bonding destination channel on the basis of the frame and processing for controlling the receiving section to newly receive the frame from the bonding destination channel;

a decoding section that decodes the frame and that acquires the packets; and a bonding section that bonds together the packets corresponding to the bonding source channel and the packets corresponding to the bonding destination channel.

(9) A receiving apparatus control method including:

a receiving procedure of selecting any one of a plurality of frequency channels as a bonding source channel and receiving a frame from the bonding source channel;

a control procedure of performing processing for obtaining one frequency channel in which packets are to be bonded with the bonding source channel among the plurality of frequency channel as a bonding destination channel on the basis of the frame and processing for controlling the receiving section to newly receive a frame from the bonding destination channel;

a decoding procedure of decoding the frame and acquiring the packets; and a bonding procedure of bonding together the packets corresponding to the bonding source channel and the packets corresponding to the bonding destination channel.

REFERENCE SIGNS LIST

100: Transmitting apparatus
110: Input formatting block
120: Stream partitioning block
130, 135: BICM block
150, 155: Framing and interleaving block
160, 165: Waveform generation section
170: RF transmitting circuit
180, 210, 215: Antenna
200: Receiving apparatus
220, 225: RF receiving circuit
230, 235: OFDM demodulation section
240, 245: L1 information processing section
250, 255: Decoding section
260: Bonding section
270: Rear stage processing section

The invention claimed is:

1. A receiving apparatus, comprising:
a receiving section configured to:
select a first frequency channel from a plurality of frequency channels as a bonding source channel; and
receive a first frame from the bonding source channel, wherein
the first frame includes a preamble, and
the preamble includes information of a BSID (Broadcast Stream ID) of a bonding destination channel;
a control section configured to:
acquire a second frequency channel from the plurality of frequency channels as the bonding destination channel, wherein
the second frequency channel is acquired based on the information of the BSID of the bonding destination channel, and
the second frequency channel corresponds to a channel in which a first plurality of packets is to be bonded with the bonding source channel; and
control the receiving section to receive a second frame from the bonding destination channel;
a decoding section configured to decode the second frame to acquire the first plurality of packets; and
a bonding section configured to bond a second plurality of packets corresponding to the bonding source channel with the first plurality of packets.

2. The receiving apparatus according to claim 1, wherein
the receiving section includes a first receiving circuit and a second receiving circuit,
the first receiving circuit is configured to receive the first frame, and
the control section is further configured to control the second receiving circuit to receive the second frame.

3. The receiving apparatus according to claim 1, wherein
the preamble further includes information of an LLS (Low Level Signaling) flag, and
the control section is further configured to control, based on a specific value of the LLS flag, the receiving section to receive the second frame.

4. The receiving apparatus according to claim 3, further comprising a rear stage processing section configured to generate a channel map from LLS information and an LMT (Link Mapping Table).

5. The receiving apparatus according to claim 4, wherein
the first frame further includes a plurality of physical layer pipes,
the preamble further includes the information of the LLS flag for each of the plurality of physical layer pipes,
the rear stage processing section is further configured to acquire the LLS information and the LMT from a physical layer pipe of the plurality of physical layer pipes, and the physical layer pipe is associated with the specific value of the LLS flag.

6. The receiving apparatus according to claim 1, wherein the first frame is associated with an ATSC (Advanced Television Systems Committee standards) 3.0 standard.

7. A communication system, comprising:

a transmitting apparatus configured to transmit a first frame from each of a plurality of frequency channels;

a receiving section configured to:
   select a frequency channel from the plurality of frequency channels as a bonding source channel; and
   receive the first frame from the bonding source channel, wherein
     the first frame includes a preamble, and
     the preamble includes information of a BSID (Broadcast Stream ID) of a bonding destination channel;

a control section configured to:
   acquire a second frequency channel from the plurality of frequency channels as the bonding destination channel, wherein
     the bonding destination channel is acquired based on the information of the BSID of the bonding destination channel, and
     the second frequency channel corresponds to a channel in which a first plurality of packets is to be bonded with the bonding source channel; and
   control the receiving section to receive a second frame from the bonding destination channel;

a decoding section configured to decode the second frame to acquire the first plurality of packets; and a bonding section configured to bond a second plurality of packets corresponding to the bonding source channel with the first plurality of packets.

8. A receiving apparatus control method, comprising:

selecting a first frequency channel from a plurality of frequency channels as a bonding source channel;

receiving a first frame from the bonding source channel, wherein
   the first frame includes a preamble, and
   the preamble includes information of a BSID (Broadcast Stream ID) of a bonding destination channel;

acquiring a second frequency channel from the plurality of frequency channels as the bonding destination channel, wherein
   the bonding destination channel is acquired based on the information of the BSID of the bonding destination channel, and
   the second frequency channel corresponds to a channel in which a first plurality of packets is to be bonded with the bonding source channel;

receiving a second frame from the bonding destination channel;

decoding the second frame to acquire the first plurality of packets; and bonding a second plurality of packets corresponding to the bonding source channel with the first plurality of packets.

\* \* \* \* \*